United States Patent [19]
Hibino

[11] Patent Number: 5,746,053
[45] Date of Patent: May 5, 1998

[54] APPARATUS FOR CONTROLLING POWER SUPPLIED TO AN ELECTRICALLY HEATED CATALYST ATTACHED TO AN EXHAUST GAS PASSAGE OF AN INTERNAL COMBUSTION ENGINE

[75] Inventor: Masahiko Hibino, Susono, Japan

[73] Assignee: Toyota Jidosha Kabushiki Kaisha, Aichi, Japan

[21] Appl. No.: 760,449

[22] Filed: Dec. 6, 1996

[30] Foreign Application Priority Data

Dec. 8, 1995 [JP] Japan .................. 7-320655

[51] Int. Cl.$^6$ .................. F01N 3/20; F01N 9/00
[52] U.S. Cl. .................. 60/277; 60/284; 60/300; 219/202
[58] Field of Search .................. 60/277, 284, 286, 60/300, 303; 219/202, 205, 481, 507, 519

[56] References Cited

U.S. PATENT DOCUMENTS

| | | | |
|---|---|---|---|
| 5,447,696 | 9/1995 | Harada | 422/174 |
| 5,553,451 | 9/1996 | Harada | 60/300 X |
| 5,555,725 | 9/1996 | Shimasaki et al. | 60/300 X |
| 5,600,949 | 2/1997 | Kato et al. | 60/300 X |

FOREIGN PATENT DOCUMENTS

| | | |
|---|---|---|
| 93/17228 | 9/1993 | European Pat. Off. |
| 4336091 | 4/1995 | Germany. |
| 6-017697-A | 1/1994 | Japan. |
| 6-055036-A | 3/1994 | Japan. |
| 6-101458-A | 4/1994 | Japan. |

OTHER PUBLICATIONS

Patent Abstracts of Japan, vol. 95, No. 008, abstract of JP-07-208259-A (Nippondenso Co. Ltd.), Aug. 8, 1995.
Patent Abstracts of Japan, vol. 018, No. 374 (M-1638), Jul. 14, 1994, abstract of JP-06-101458-A (Nissan Motor Co. Ltd.), Apr. 12, 1994.

*Primary Examiner*—Tony M. Argenbright
*Attorney, Agent, or Firm*—Kenyon & Kenyon

[57] ABSTRACT

When an apparatus for supplying power to an EHC becomes faulty, the supply of power to the EHC is shut off by a means which is separate from a control relay to prevent the catalyst from being overheated. The control relay that is opened and closed by an ECU is provided in a circuit that supplies electric power from a power source to the EHC attached to an exhaust gas passage of an internal combustion engine, and power supplied to the EHC is controlled by the control relay. When the control relay is short-circuited, this short-circuiting fault is detected by some means, and the power supply circuit is forcibly shut off so that power will not be continuously supplied to the EHC from the power source in this state. Means for forcibly shutting off the power supply circuit may be a relay, a breaker or a fuse when the power source is a battery, and may be to suppress the amount of power generated by an alternator when the power source is the alternator.

17 Claims, 16 Drawing Sheets

5,746,053

APPARATUS FOR CONTROLLING POWER SUPPLIED TO AN ELECTRICALLY HEATED CATALYST ATTACHED TO AN EXHAUST GAS PASSAGE OF AN INTERNAL COMBUSTION ENGINE

BACKGROUND OF THE INVENTION

1. Field of the Invention

The present invention relates to an apparatus for controlling power supplied to an electrically heated catalyst. More particularly, the invention relates to an apparatus for controlling power supplied to an electrically heated catalyst attached to an exhaust gas passage of an internal combustion engine, the apparatus being capable of preventing the catalyst from being overheated in case a control relay for controlling the supply of electric power to the electrically heated catalyst is short-circuited.

2. Description of the Related Art

Exhaust gases emitted from an internal combustion engine of a vehicle contain such impurities as HC (hydrocarbons), CO (carbon monoxide) and NOx (nitrogen oxides). In an exhaust gas passage of an internal combustion engine, a catalytic converter which is a device for removing impurities contained in the exhaust gases is usually provided. However, it is known that when the temperature of the catalyst is low (in an inactive state), the three-way catalyst used in the catalytic converter works to remove only some of the impurities contained in the exhaust gases. Therefore, when the catalytic converter is in the inactive state after, for example, cold starting of the internal combustion engine, the exhaust gases cannot be cleaned to a sufficient degree.

There has been proposed a device for cleaning exhaust gases which is installed in the exhaust gas passage on the upstream side of the catalytic converter, the device incorporating an electrically heated catalyst (EHC: electrically heated catalyst) which is a second electrically heated catalytic converter carrying an oxidizing catalyst and having an electric heater. According to this device for cleaning exhaust gases, when the catalytic converter is still inactive, the second catalytic converter is electrically heated to activate the oxidizing catalyst and to promote the removal of HC.

The electric power needs to be supplied to the electrically heated catalyst until the catalytic converter is activated. After the activity of the catalytic converter is detected by some means, the electric power is no longer supplied to the electrically heated catalyst.

The catalytic activity is not exhibited at an early time when the electrically heated catalyst is deteriorated or becomes defective. In such a case, the electric power is better not supplied to the electrically heated catalyst. Japanese Unexamined Patent Publication No. 6-101458 discloses technology for interrupting the supply of electric power to the electrically heated catalyst when the electrically heated catalyst becomes defective or is deteriorated.

In general, the supply of electric power to the electrically heated catalyst is interrupted by using a switch such as a control relay which may be, for example, a mechanical electromagnetic relay or one utilizing a semiconductor device.

According to the above-mentioned prior art, however, in case the control relay becomes defective due to, for example, melt-adhesion, the supply of electric power is not interrupted, and the electrically heated catalyst is abnormally heated and is likely to be broken at an early time. Besides, the amount of electric power consumed by the electrically heated catalyst is larger than the amount of electric power generated by the alternator and, hence, the battery is depleted causing the vehicle to no longer continue running.

SUMMARY OF THE INVENTION

The object of the present invention therefore is to provide an apparatus for controlling power supplied to an electrically heated catalyst capable of detecting a fault in the apparatus and to provide an apparatus for controlling power supplied to an electrically heated catalyst capable of interrupting the supply of electric power to the catalyst to prevent the catalyst from being broken when a fault in the apparatus is detected.

According to a first aspect of the present invention, the above-mentioned object is accomplished by an apparatus for controlling power supplied to an electrically heated catalyst attached to an exhaust gas passage of an internal combustion engine equipped with an air-to-fuel ratio feedback control device, wherein a circuit for supplying electric power from a power source to the electrically heated catalyst is equipped with a circuit opening/closing means which is opened or closed by a control circuit of the internal combustion engine, and wherein an exhaust gas temperature detector means for detecting the exhaust gas temperature of the internal combustion engine is provided in the exhaust gas passage on the downstream side of the electrically heated catalyst, and an abnormality detector means is provided to receive an output from the exhaust gas temperature detector means and an output from the air-to-fuel ratio detector means of the air-to-fuel ratio feedback control device, the abnormality detector means determining the circuit opening/closing means to be abnormal when a detection value of the exhaust gas detector means has exceeded a reference value in a state where the electrically heated catalyst is not in a period of being heated and where the detection value of the air-to-fuel ratio detector means is indicating a normal value.

According to a second aspect of the present invention, the above-mentioned object is accomplished by an apparatus for controlling power supplied to an electrically heated catalyst attached to an exhaust gas passage of an internal combustion engine, wherein a circuit for supplying electric power from a power source to the electrically heated catalyst is equipped with a circuit opening/closing means which is opened or closed by a control circuit of the internal combustion engine, and wherein a fault detector means is provided to detect the occurrence of such a fault that the supply of electric power to the electrically heated catalyst is not interrupted by the circuit opening/closing means, a forcible circuit shut-off means for forcibly shutting off the power supply circuit during the operation is provided separately from the circuit opening/closing means in the circuit which supplies electric power from the power source to the electrically heated catalyst, and the forcible circuit shut-off means is operated when a fault is detected by the fault detector means.

In the apparatus for controlling power supplied to the electrically heated catalyst according to the second aspect, a circuit opening/closing means of the same constitution as the above circuit opening/closing means may be used as the means for forcibly shutting off the circuit, or may be provided by the power supply circuit to constitute an exchangeable unit which is provided with a cut-off means to cut the power supply circuit from the external side.

According to a third aspect of the present invention, the above-mentioned object is accomplished by an apparatus for controlling power supplied to electrically heated catalysts which are provided in a plural number and are connected in parallel in the exhaust gas passages of an internal combustion engine, wherein a circuit for supplying electric power from a power source in a preceding stage to the electrically heated catalysts connected in parallel is equipped with a circuit opening/closing means which is opened or closed by a control circuit of the internal combustion engine, and wherein a fault detector means is provided to detect the occurrence of such a fault that the supply of electric power to the electrically heated catalysts is not interrupted by the circuit opening/closing means, a connection change-over means is provided to connect the parallel-connected electrically heated catalysts in series with the power source, and wherein, when a fault is detected by the fault detector means, the connection change-over means is operated so that the electrically heated catalysts are all connected in series.

According to a fourth aspect of the present invention, the above-mentioned object is accomplished by an apparatus for controlling power supplied to an electrically heated catalyst attached to an exhaust gas passage of an internal combustion engine, wherein a circuit for supplying electric power from a power source to the electrically heated catalyst is equipped with a circuit opening/closing means which is opened or closed by a control circuit of the internal combustion engine, and wherein the power source is a generator that generates electricity being driven by the internal combustion engine, and provision is made of a fault detector means for detecting the occurrence of such a fault that the supply of electric power to the electrically heated catalyst cannot be interrupted by the circuit opening/closing means and means for controlling the amount of power generation which lowers the rotational speed of the internal combustion engine when a fault is detected by the fault detector means.

According to a fifth aspect of the present invention, the above-mentioned object is accomplished by an apparatus for controlling power supplied to an electrically heated catalyst attached to an exhaust gas passage of an internal combustion engine, wherein a circuit for supplying electric power from a power source to the electrically heated catalyst is equipped with a circuit opening/closing means which is opened or closed by a control circuit of the internal combustion engine, and wherein the power source is a generator that generates electricity being driven by the internal combustion engine, and provision is made of a fault detector means for detecting the occurrence of such a fault that the supply of electric power to the electrically heated catalyst cannot be interrupted by the circuit opening/closing means and a field current suppressing means which suppresses the field current of the generator when a fault is detected by the fault detector means.

According to the first aspect of the present invention, an abnormal condition in the circuit opening/closing means in the circuit for supplying electric power to the electrically heated catalyst can be correctly determined depending upon the exhaust gas temperature of the internal combustion engine and upon the air-to-fuel ratio.

According to the second aspect of the present invention, when an abnormal condition is detected in the circuit opening/closing means in the circuit for supplying electric power to the electrically heated catalyst, the circuit for supplying electric power to the electrically heated catalyst is forcibly cut off. Therefore, the catalyst is not overheated, and reliability is enhanced even when a fault has occurred in the power supply circuit. If the forcible circuit shut-off means is the same as the circuit opening/closing means of the power supply control circuit, the parts can be used in common to decrease the cost. Moreover, if the forcible circuit shut-off means is replaceably attached, the power supply circuit can be easily restored.

According to the third aspect of the present invention, when an abnormal condition is detected in the circuit opening/closing means in the circuit for supplying electric power to the electrically heated catalysts, the plurality of electrically heated catalysts are connected in series to increase the overall resistance and to thereby decrease the flow of electric current and to prevent the catalysts from being overheated.

According to the fourth and fifth aspects of the invention, the amount of electric power generated by the generator driven by the internal combustion engine is suppressed to avoid the catalyst from being overheated.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Embodiments of the invention will now be described in detail with reference to the accompanying drawings.

Figure 1:
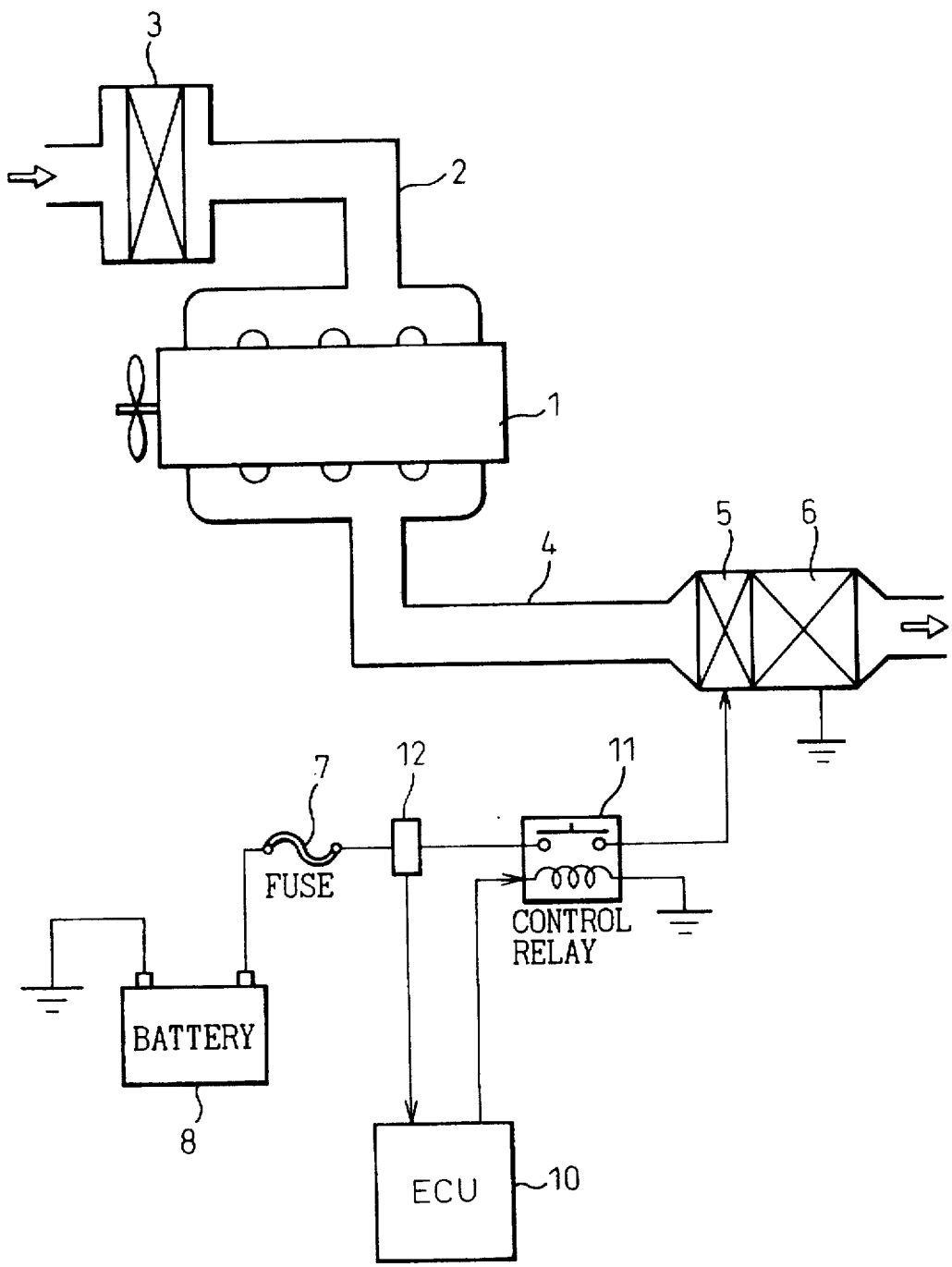
FIG. 1 is a diagram illustrating a first embodiment for detecting a fault in the power supply circuit in an apparatus for controlling power supplied to an electrically heated catalyst of the present invention.

FIG. 1 is a diagram illustrating a first embodiment for detecting the faulty state of a power supply circuit in an apparatus for controlling power supplied to an electrically heated catalyst of the present invention, and wherein reference numeral 1 denotes an internal combustion engine, and an air cleaner 3 is provided in an intake passage 2. An ordinary catalytic converter 6 is provided in the exhaust gas passage 4 of the internal combustion engine 1, and an electrically heated catalyst (hereinafter referred to as EHC) 5 is provided on the upstream side of the catalytic converter 6 and close thereto.

Electric power is supplied to the EHC 5 from a battery 8 which drives the internal combustion engine 1 through a fuse 7 for the EHC, and a control relay 11 is provided between the fuse 7 and the EHC 5 to turn on or off the supply of electric power to the EHC 5. The control relay 11 is turned on or off by an ECU (engine control unit) 10.

In this embodiment, furthermore, a Hall element unit 12 which is a current detector means is provided in the power supply circuit between the fuse 7 and the control relay 11. The Hall element unit 12 detects the flow of electric current by detecting the magnetism that is generated when the electric current flows through the power supply circuit, and a detected current value is input to the ECU 10.

In the apparatus for controlling power supplied to the EHC 5 equipped with the above-mentioned first embodiment for detecting the faulty state of the power supply circuit, the ECU 10 determines that the control relay 11 is short-circuited upon receiving a current detection signal from the Hall element unit 12 in a state where the control relay 11 is not turned on.

Figure 2:
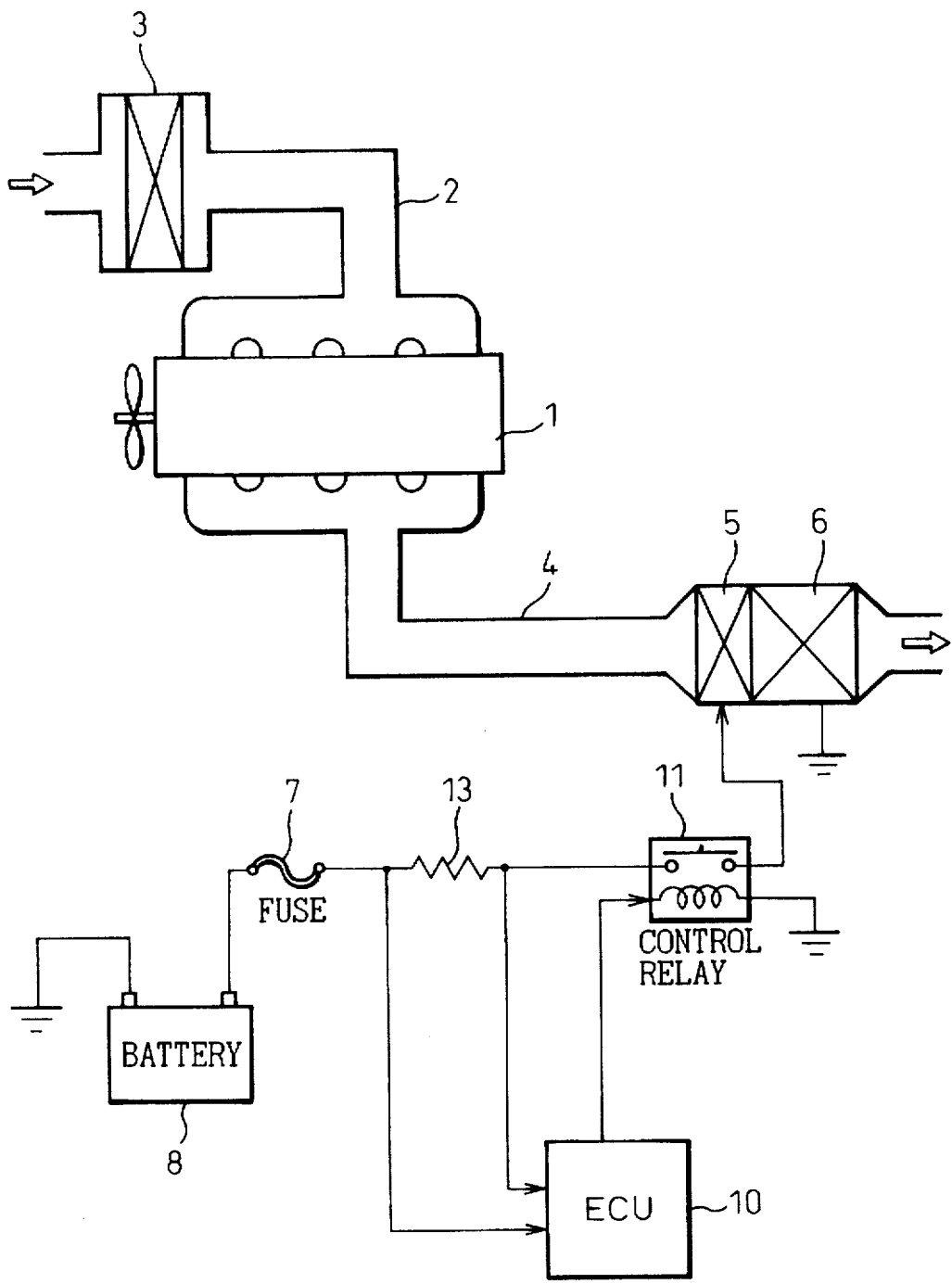
FIG. 2 is a diagram illustrating a second embodiment for detecting a fault in the power supply circuit in an apparatus for controlling power supplied to an electrically heated catalyst of the present invention.

FIG. 2 is a diagram illustrating a second embodiment for detecting the faulty state of the power supply circuit in an apparatus for controlling power supplied to an electrically heated catalyst of the present invention. The constitution of the second embodiment is different from the constitution of the first embodiment for detecting the faulty state of the power supply circuit only in regard to the method of detecting a current that flows into the power supply circuit. Therefore, the same constituent members as those of the first embodiment for detecting the faulty state of the power supply circuit described with reference to FIG. 1 are denoted by the same reference numerals but their description is not repeated.

In the first embodiment for detecting the faulty state of the power supply circuit explained with reference to FIG. 1, the current flowing through the power supply circuit is detected by using the Hall element unit 12. In the second embodiment, however, a shunt resistance 13 is provided in the power supply circuit between the fuse 7 and the control relay 11, and a voltage detected across the shunt resistance 13 is input to the ECU 10.

In the apparatus for controlling power supplied to the EHC 5 equipped with the above-mentioned second embodiment for detecting the faulty state of the power supply circuit, the ECU 10 determines that the control relay 11 is short-circuited upon detecting the flow of a current through the shunt resistance 13 relying upon a voltage produced across the shunt resistor 13 in a state where the control relay 11 is not turned on.

Figure 3:
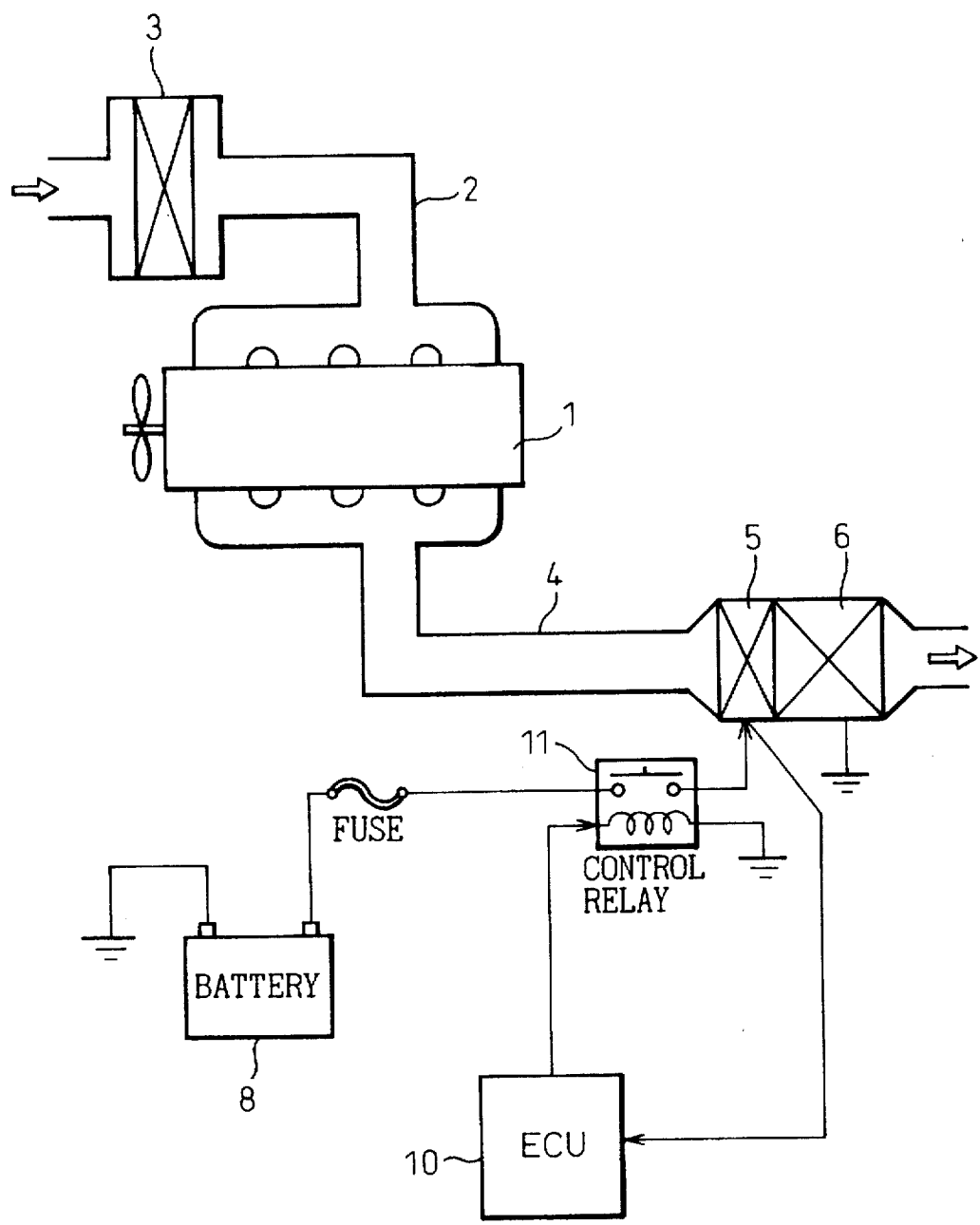
FIG. 3 is a diagram illustrating a third embodiment for detecting a fault in the power supply circuit in an apparatus for controlling power supplied to an electrically heated catalyst of the present invention.

FIG. 3 is a diagram illustrating a third embodiment for detecting the faulty state of the power supply circuit in an apparatus for controlling power supplied to an electrically heated catalyst of the present invention. The constitution of the third embodiment is different from the constitution of the first embodiment for detecting the faulty state of the power supply circuit only in regard to that the short circuit in the control relay 11 is determined upon detecting a terminal voltage of the EHC 5 though the short circuit in the control relay 11 was determined in the first embodiment by detecting a current flowing into the power supply circuit. Therefore, the same constituent members as those of the first embodiment for detecting the faulty state of the power supply circuit described with reference to FIG. 1 are denoted by the same reference numerals but their description is not repeated.

In the first embodiment for detecting the faulty state of the power supply circuit described with reference to FIG. 1, the current flowing through the power supply circuit is detected by using the Hall element unit 12. In the third embodiment for detecting the faulty state of the power supply circuit, however, a voltage applied to the power source terminal of the EHC 5 is input to the ECU 10.

In the apparatus for controlling power supplied to the EHC 5 equipped with the above-mentioned third embodiment for detecting the faulty state of the power supply circuit, the ECU 10 determines that the control relay 11 is short-circuited upon detecting a voltage at the power source terminal of the EHC 5 in a state where the control relay 11 is not turned on.

Figure 4:
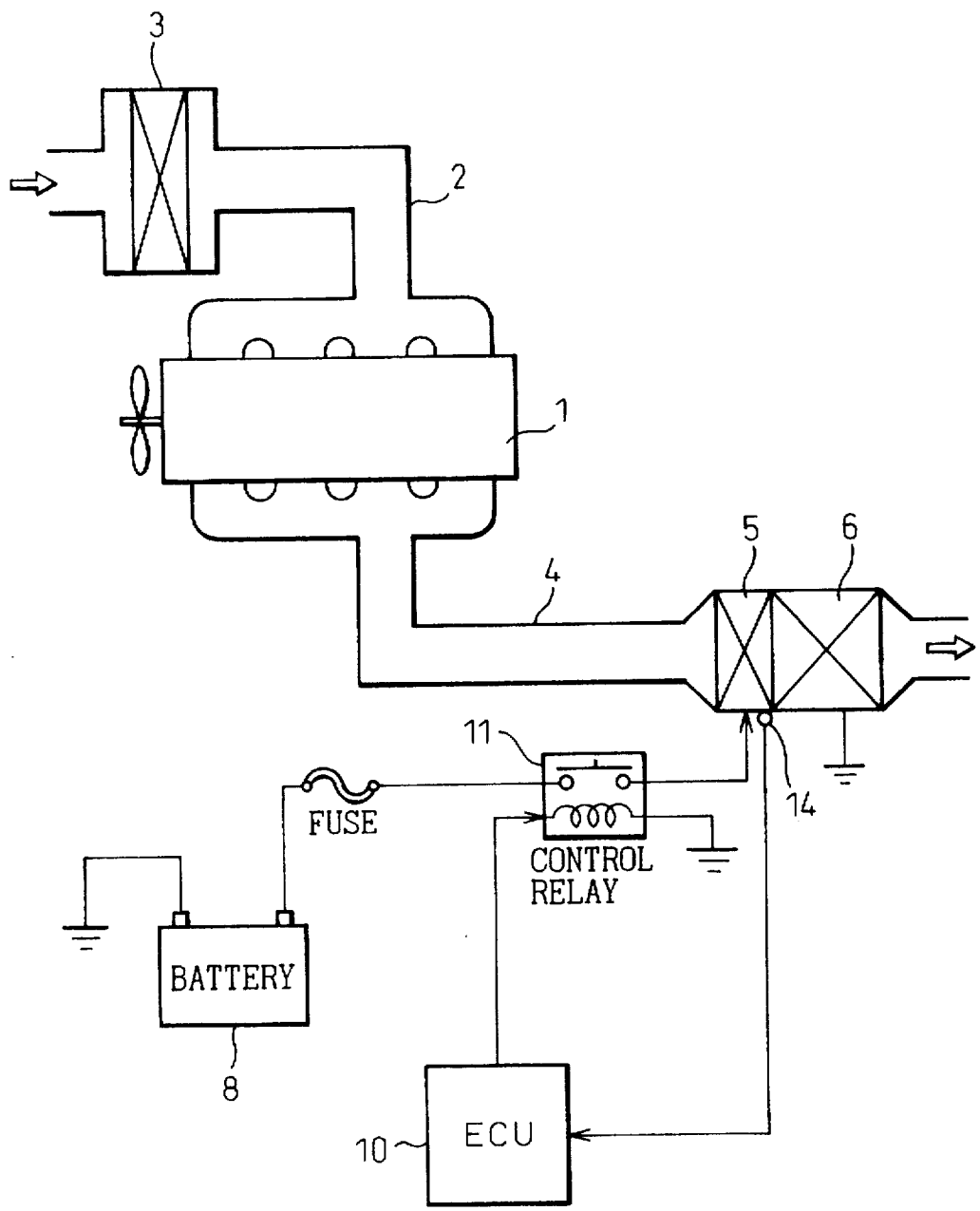
FIG. 4 is a diagram illustrating a fourth embodiment for detecting a fault in the power supply circuit in an apparatus for controlling power supplied to an electrically heated catalyst of the present invention.

FIG. 4 is a diagram illustrating a fourth embodiment for detecting the faulty state of the power supply circuit in an apparatus for controlling power supplied to an electrically heated catalyst of the present invention. The constitution of the fourth embodiment is nearly the same as the constitution of the third embodiment for detecting the faulty state of the power supply circuit. Therefore, the same constituent members as those of FIG. 3 are denoted by the same reference numerals but their description is not repeated. In the third embodiment for detecting the faulty state of the power supply circuit, the short circuit in the control relay 11 is determined upon detecting the terminal voltage of the EHC 5. In the fourth embodiment for detecting the faulty state of the power supply circuit, on the other hand, the short circuit in the control relay 11 is determined upon detecting the temperature of the EHC 5. In the fourth embodiment for detecting the faulty state of the power supply circuit, therefore, a temperature sensor 14 is mounted near the EHC 5, and a temperature detected by the temperature sensor 14 is input to the ECU 10.

In the apparatus for controlling power supplied to the EHC 5 equipped with the above-mentioned fourth embodiment for detecting the faulty state of the power supply circuit, the ECU 10 determines that the control relay 11 is short-circuited upon detecting the temperature of the EHC 5 by the temperature sensor 14 in a state where the control relay 11 is not turned on.

Figure 5:
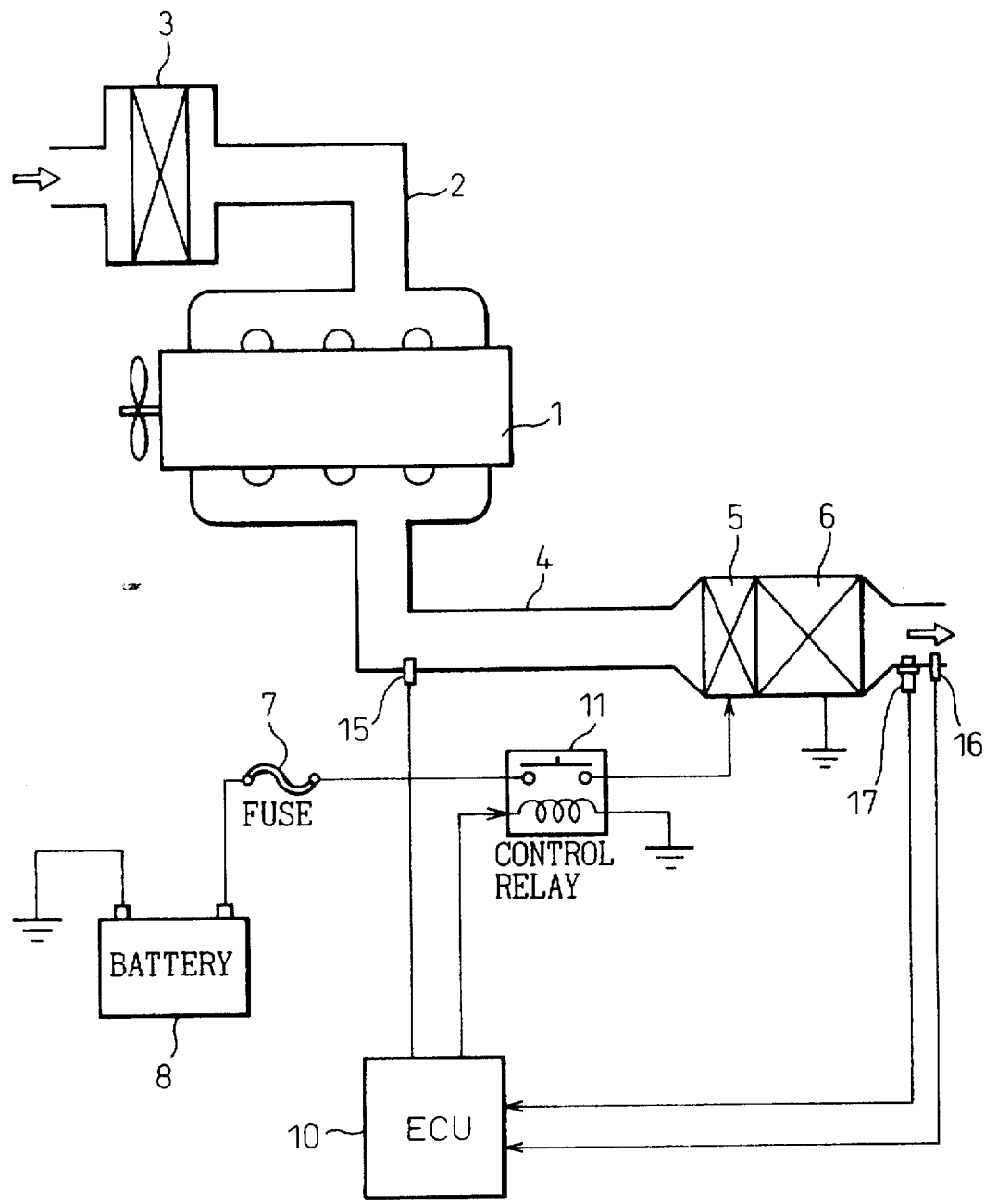
FIG. 5 is a diagram illustrating a fifth embodiment for detecting a fault in the power supply circuit in an apparatus for controlling power supplied to an electrically heated catalyst of the present invention.

FIG. 5 is a diagram illustrating a fifth embodiment for detecting the faulty state of the power supply circuit in an apparatus for controlling power supplied to an electrically heated catalyst of the present invention. The fifth embodiment is applied to the internal combustion engine 1 equipped with an air-to-fuel ratio feedback control device. The internal combustion engine 1 equipped with the air-to-fuel ratio feedback control device includes the EHC 5, and air-to-fuel ratio sensors ($O_2$ sensors) 15 and 16 provided in the exhaust gas passage 4 on the upstream side and on the downstream side of the ordinary catalytic converter 6. In addition to this constitution, the fifth embodiment for detecting the faulty state of the power supply circuit includes an exhaust gas temperature sensor 17 provided in the exhaust gas passage 4 on the downstream side of the ordinary catalytic converter 6. The values of the $O_2$ sensors 15 and 16, and the value detected by the exhaust gas temperature sensor 17 are input to the ECU 10. Electric power is supplied to the EHC 5 from the battery 8 through the fuse 7 and control relay 11 as in the aforementioned embodiments.

In the apparatus for controlling power supplied to the EHC 5 equipped with the above-mentioned fifth embodiment for detecting the faulty state of the power supply circuit, the ECU 10 determines that the control relay 11 is short-circuited when the temperature detected by the exhaust gas temperature sensor 17 indicates that the EHC 5 is heated when the control relay 11 is not turned on and the $O_2$ sensors 15 and 16 are detecting the ordinary air-to-fuel ratio. In this determination, the control relay 11 is not determined to be short-circuited when the amount of fuel injection is increased and the temperature of the exhaust gas is elevated. Therefore, erroneous determination is avoided.

Figure 6:
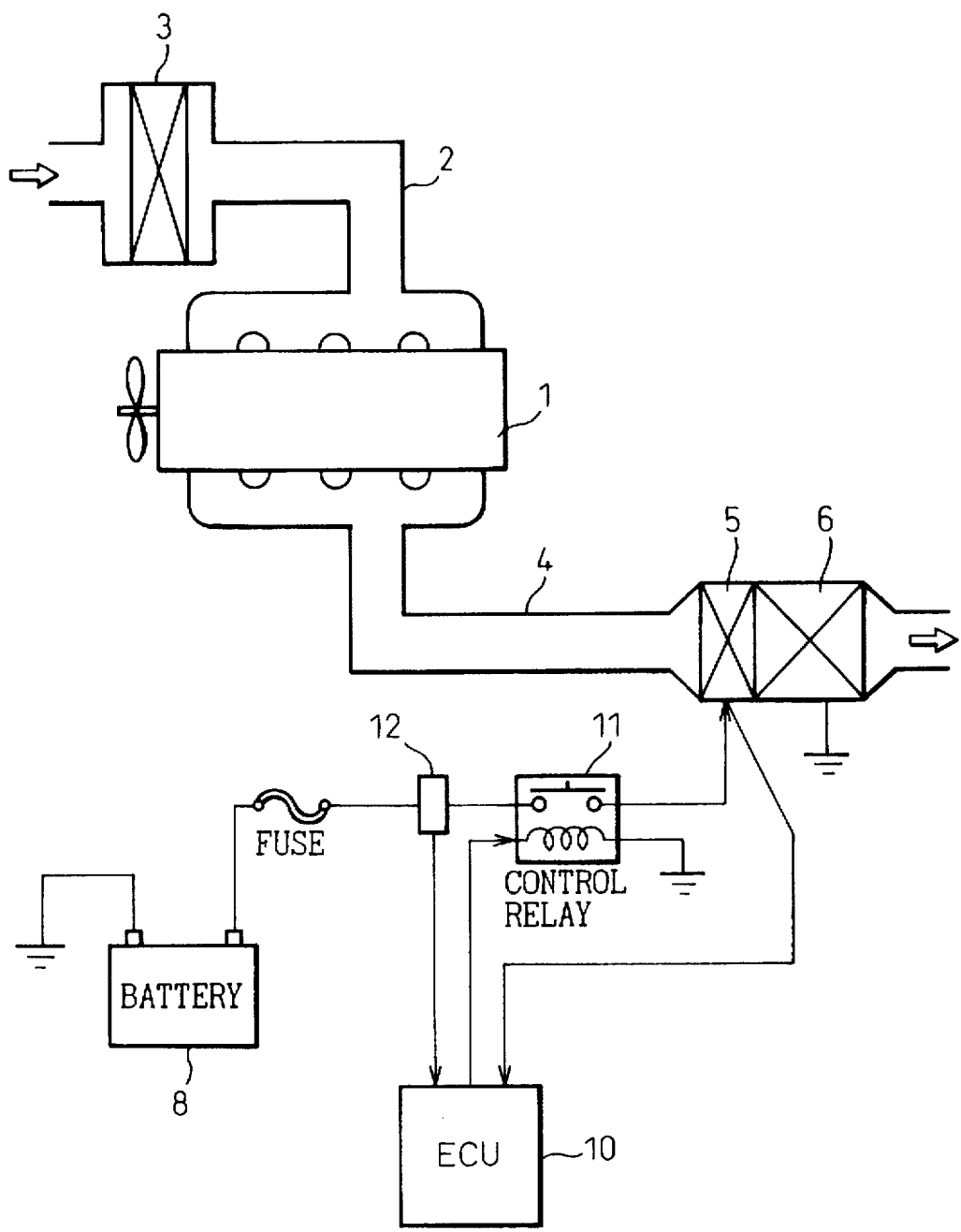
FIG. 6 is a diagram illustrating a sixth embodiment for detecting a fault in the power supply circuit in an apparatus for controlling power supplied to an electrically heated catalyst of the present invention.

FIG. 6 is a diagram illustrating a sixth embodiment for detecting the faulty state of the power supply circuit in an apparatus for controlling power supplied to an electrically heated catalyst of the present invention. The sixth embodiment is a combination of detecting a current flowing through the power supply circuit explained in FIG. 1 and detecting a terminal voltage of the EHC 5 explained in FIG. 3. The same constituent members as those described with reference to these drawings are denoted by the same reference numerals.

In the sixth embodiment for detecting the faulty state of the power supply circuit, a current detected by the Hall element unit 12 which is a current sensor provided in the power supply circuit and a terminal voltage of the EHC 5 are input to the ECU 10 which, therefore, detects the resistance of the EHC 5 from the current and the voltage that are input. The resistance of the EHC 5 exhibits a temperature gradient, and the resistance of the EHC 5 increases with an increase in the temperature of the EHC 5.

In the apparatus for controlling power supplied to the EHC 5 equipped with the above-mentioned sixth embodiment for detecting the faulty state of the power supply circuit, the ECU 10 determines that the control relay 11 is short-circuited upon detecting that the resistance of the EHC 5 has abnormally exceeded a reference value in a state where the control relay 11 is not turned on.

When the short-circuiting fault in the control relay 11 in the power supply circuit is detected in the apparatus for controlling power supplied to the EHC 5 by the above-mentioned embodiment for detecting a faulty state of the power supply circuit, a countermeasure is taken so that the EHC 5 will not be melted or that the battery will not be depleted.

Figure 7:
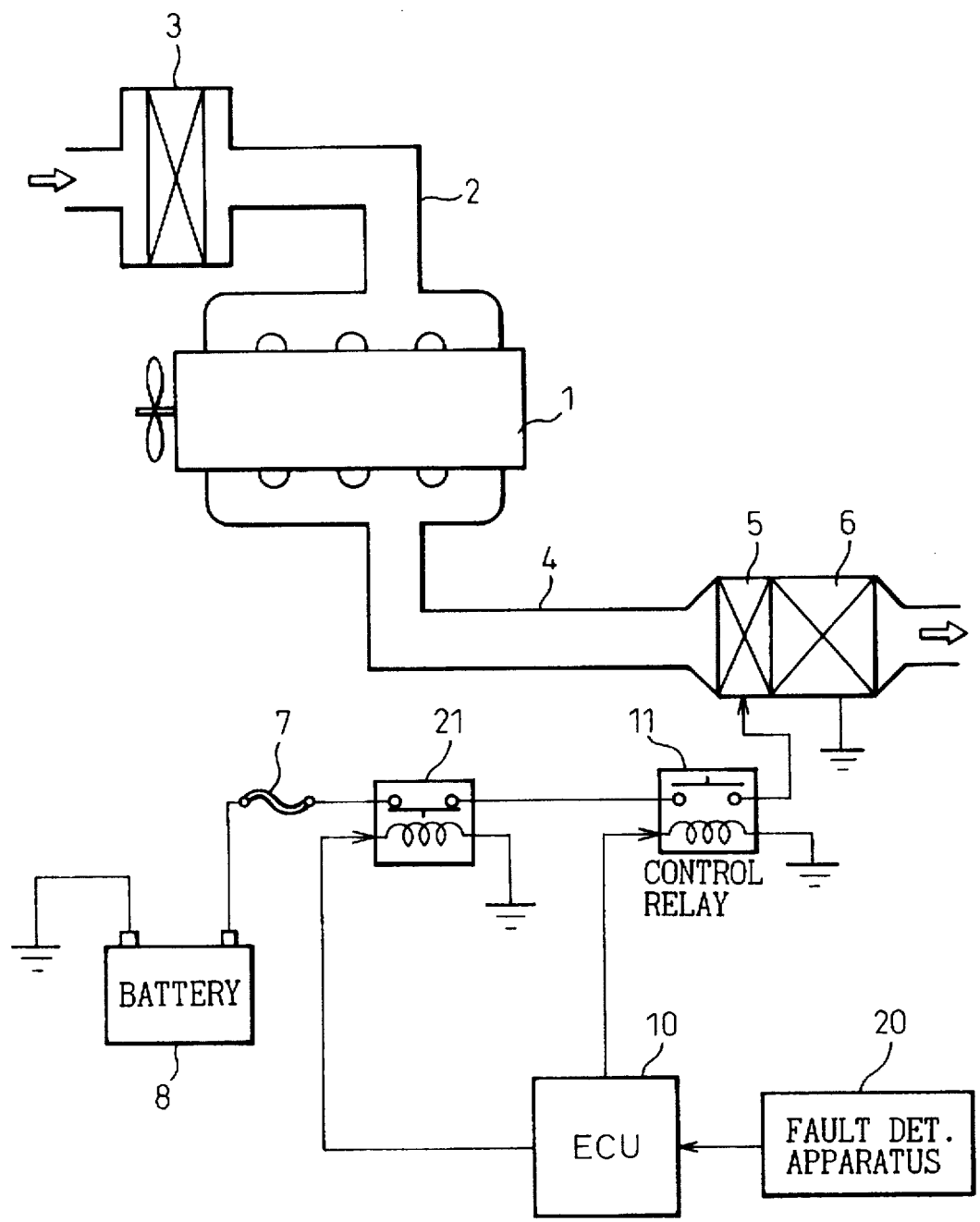
FIG. 7 is a diagram illustrating the constitution of the first embodiment of the apparatus for controlling power supplied to an electrically heated catalyst of the present invention.

FIG. 7 is a diagram illustrating the constitution of the first embodiment of the device for controlling power supplied to an electrically heated catalyst of the present invention, wherein reference numeral 1 denotes an internal combustion engine, and an air cleaner 3 is provided in an intake air passage 2. An ordinary catalytic converter 6 is provided in an exhaust gas passage 4 of the internal combustion engine 1, and an EHC 5 is provided on the upstream side of the ordinary catalytic converter 6 and close thereto.

In this embodiment, electric power is supplied to the EHC 5 from the battery 8 that drives the internal combustion engine 1 through a fuse 7 for the EHC. A control relay 11 is provided between the fuse 7 and the EHC 5 to turn on or off the supply of electric power to the EHC 5. The control relay 11 is turned on or off by the ECU 10. To the ECU 10 is connected an apparatus for detecting fault of the control relay 11 described with reference to any one of FIGS. 1 to 6.

In this embodiment, furthermore, a relay 21 for shutting off the circuit is provided in the power supply circuit between the fuse 7 and the control relay 11. The relay 21 may be constituted quite in the same manner as the control relay 11, and is opened and closed by the ECU 10.

In the thus constituted apparatus for controlling power supplied to the EHC 5 of the first embodiment, the relay 21 is turned off by the ECU 10 when it is so determined by the fault detecting apparatus 20 that the control relay 11 is short-circuited, and the supply of electric power from the battery 8 to the EHC 5 is interrupted. As a result, the EHC 5 is not overheated, and reliability is improved when fault has occurred. When a relay the same as the control relay 11 is used as the relay 21, the parts can be used in common.

Figure 8:
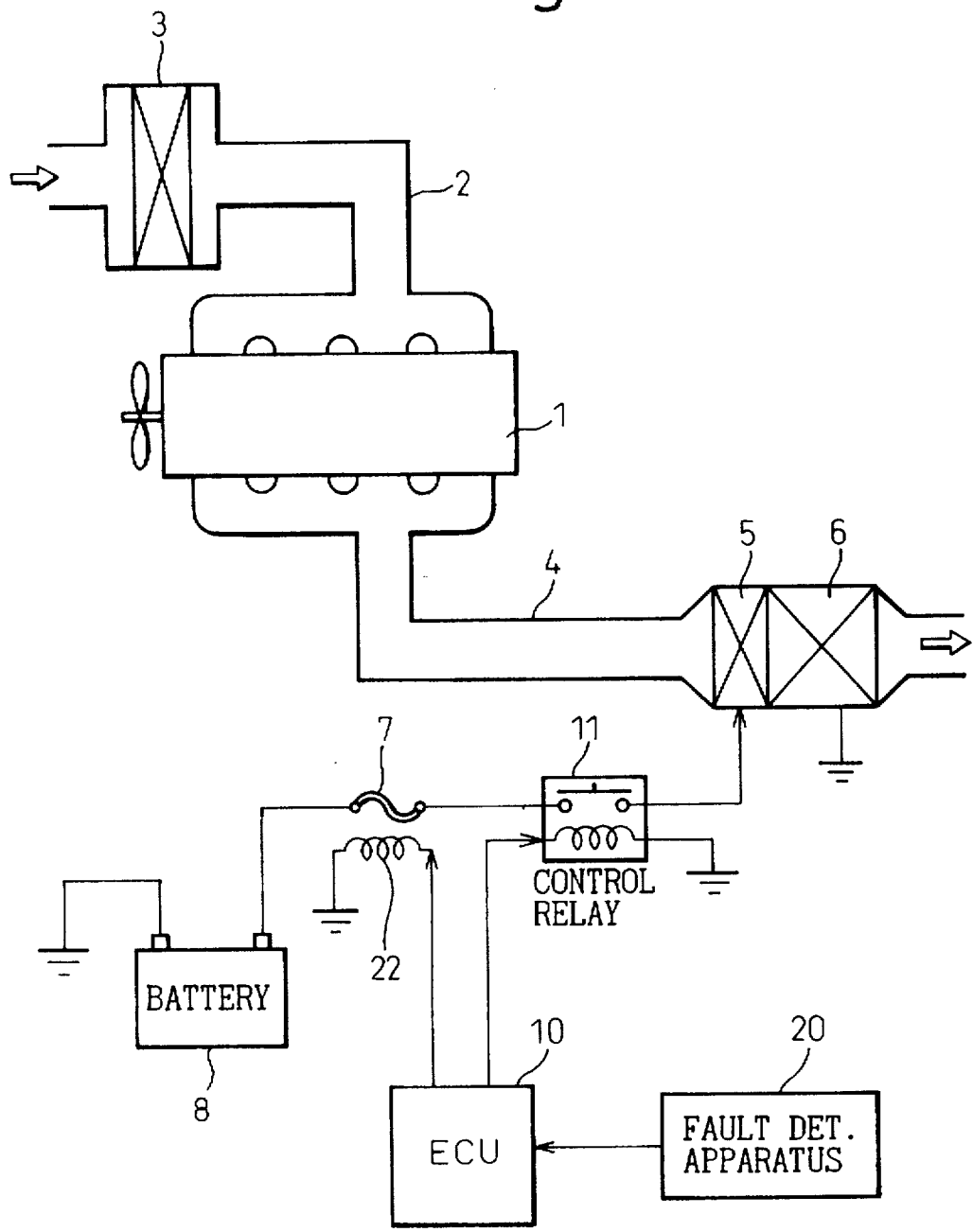
FIG. 8 is a diagram illustrating the constitution of the second embodiment of the apparatus for controlling power supplied to an electrically heated catalyst of the present invention.

FIG. 8 is a diagram illustrating the constitution of the apparatus for controlling power supplied to the electrically heated catalyst according to the second embodiment of the present invention. The second embodiment is different from the aforementioned first embodiment only with respect to the constitution for shutting off the power supply circuit to the EHC 5. Therefore, the same constituent members as those of the apparatus for controlling power supplied to the electrically heated catalyst of the first embodiment explained with reference to FIG. 7 are denoted by the same reference numerals but their description is not repeated.

In the apparatus for controlling power supplied to the electrically heated catalyst of the first embodiment described with reference to FIG. 7, the power supply circuit is shut off by the relay 21 provided between the fuse 7 and the control relay 11. In the second embodiment, however, a heater 22 is provided near the fuse 7 to melt the fuse. The heater 22 is heated upon being supplied with electric power from the ECU 10, and the fuse 7 is melted by the heat of the heater 22.

In the thus constituted apparatus for controlling power supplied to the electrically heated catalyst according to the second embodiment, electric power is supplied to the heater 22 by the ECU 10 when it is determined by the fault detecting apparatus 20 that the control relay 11 is short-circuited, and the supply of electric power to the EHC 5 from the battery 8 is interrupted when the fuse 7 is melted. As a result, it is made possible to prevent the EHC 5 from being overheated, and reliability is enhanced in case a fault has occurred.

Figure 9:
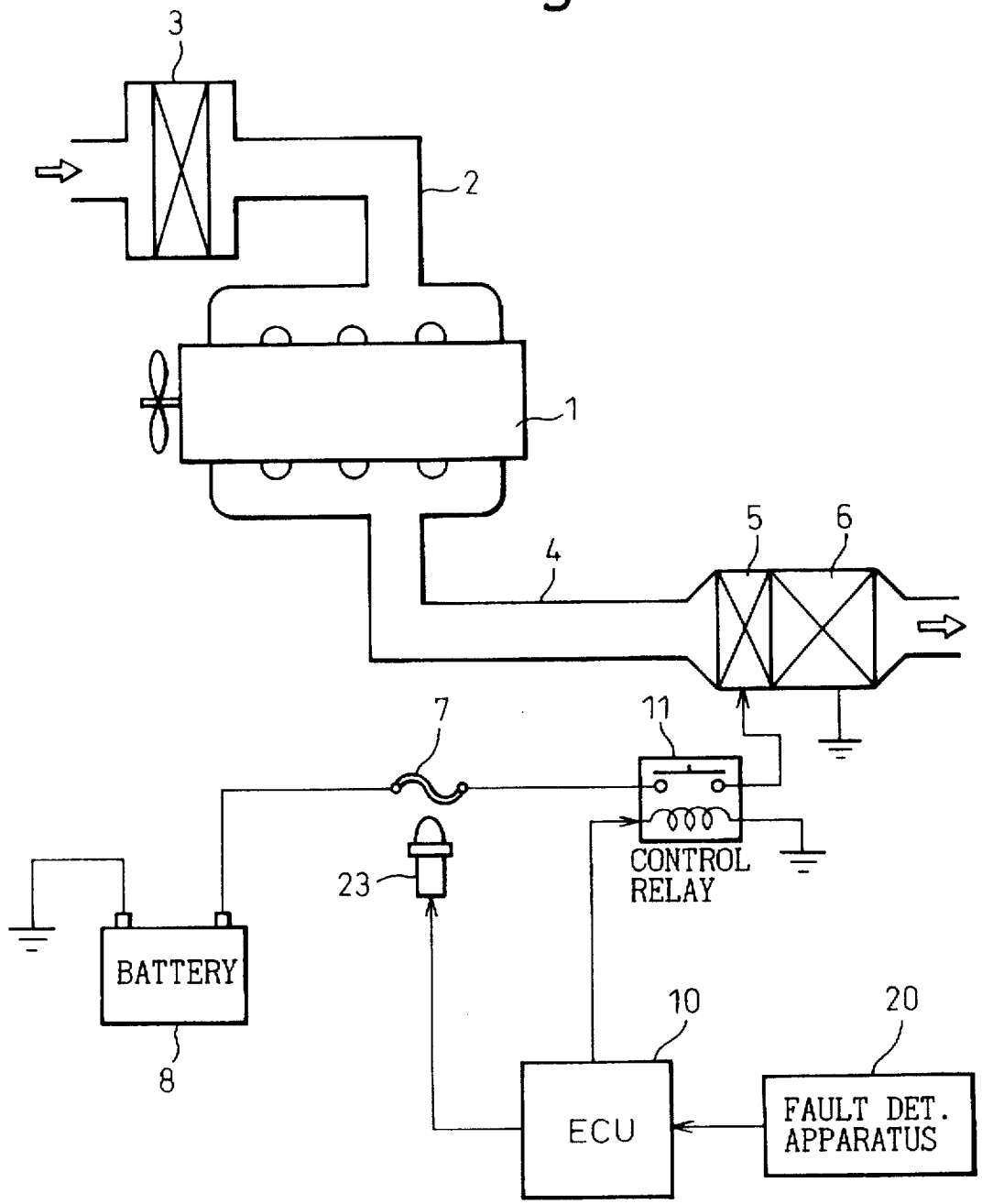
FIG. 9 is a diagram illustrating the constitution of the third embodiment of the apparatus for controlling power supplied to an electrically heated catalyst of the present invention.

FIG. 9 is a diagram illustrating the constitution of the apparatus for controlling power supplied to the electrically heated catalyst according to the third embodiment of the present invention. The third embodiment is different from the second embodiment only in regard to the constitution for melting the fuse 7. Therefore, the same constituent members as those of the apparatus for controlling power supplied to the electrically heated catalyst of the first embodiment described with reference to FIG. 8 are denoted by the same reference numerals and their description is not repeated.

In the apparatus for controlling power supplied to the electrically heated catalyst of the second embodiment described with reference to FIG. 8, the heater 22 is provided near the fuse 7 to melt the fuse. According to the third embodiment, however, a burner 23 is provided near the use 7 instead of the heater 22 to melt the fuse. The burner 23 is ignited by an ignition signal from the ECU 10 and produces a flame to melt the fuse 7.

In the thus constituted apparatus for controlling power supplied to the electrically heated catalyst according to the third embodiment, the burner 23 is ignited by the ECU 10 and the flame is directed towards the fuse when it is determined by the fault detecting apparatus 20 that the control relay 11 is short-circuited, and the supply of electric power to the EHC 5 from the battery 8 is interrupted when the fuse 7 is melted. As a result, it is made possible to prevent the EHC 5 from being overheated, and reliability is enhanced in case a fault has occurred.

Figure 10:
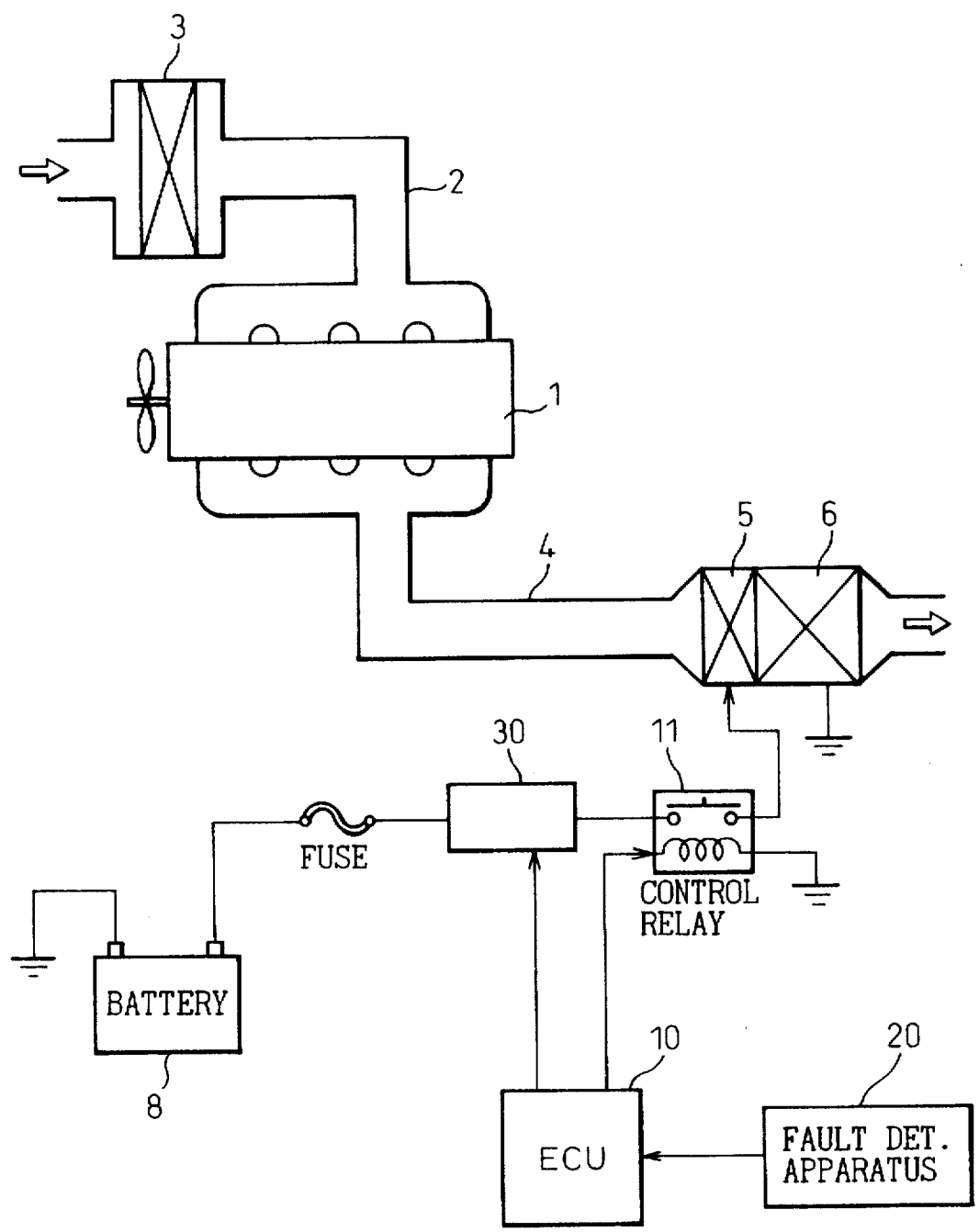
FIG. 10 is a diagram illustrating the constitution of the fourth embodiment of the apparatus for controlling power supplied to an electrically heated catalyst of the present invention.

FIG. 10 is a diagram illustrating the constitution of the apparatus for controlling power supplied to the electrically heated catalyst according to the fourth embodiment of the present invention. The fourth embodiment is different from the first embodiment only in regard to the constitution for shutting off the power supply circuit to the EHC 5. Therefore, the same constituent members as those of the apparatus for controlling power supplied to the electrically heated catalyst of the first embodiment described with reference to FIG. 7 are denoted by the same reference numerals and their description is not repeated.

In the apparatus for controlling power supplied to the electrically heated catalyst of the first embodiment described with reference to FIG. 7, the power supply circuit is shut off by the relay 21 provided between the fuse 7 and the control relay 11. According to the fourth embodiment, however, a breaker 30 is provided between the fuse 7 and the control relay 11. The breaker 30 operates upon being supplied with electric power from the ECU 10 and shuts off the power supply circuit between the fuse 7 and the control relay 11.

In the thus constituted apparatus for controlling power supplied to the electrically heated catalyst according to the fourth embodiment, electric power is supplied to the breaker 30 by the ECU 10 when it is determined by the fault detecting apparatus 20 that the control relay 11 is short-circuited, and the supply of electric power to the EHC 5 from the battery 8 is interrupted when the power supply circuit is shut off between the fuse 7 and the control relay 11. As a result, it is made possible to prevent the EHC 5 from being overheated, and reliability is enhanced when a fault has occurred.

FIGS. 11A to 11D are diagrams illustrating embodiments of internal constitution of the breaker 30 of FIG. 10. The breaker 30 shown in FIG. 11A has a contact 31 that is turned off when the temperature is raised. By the contact 31 is provided a heating coil 32 which is branching from the power supply circuit.

Figure 11A:
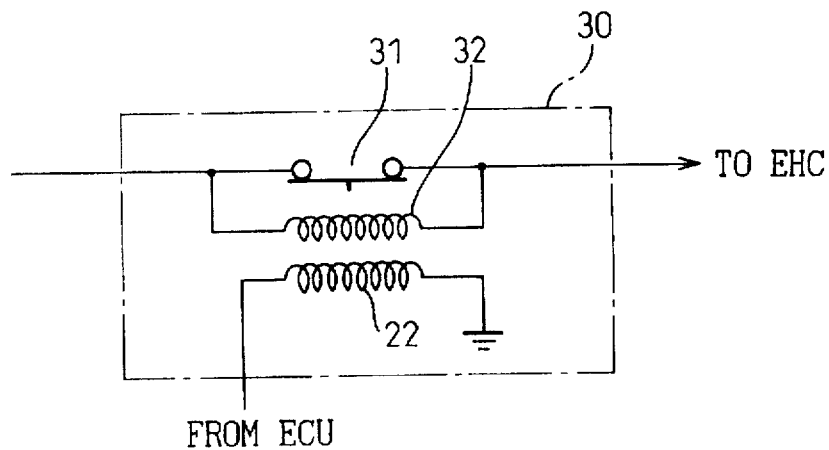
FIG. 11A is a circuit diagram illustrating the first embodiment of the internal constitution of the breaker of FIG. 10.

When the amount of electric power supplied to the EHC 5 exceeds the predetermined value, an increased current flows into the heating coil 32 in the breaker 30, whereby the heating coil 32 is heated and the contact 31 is turned off. In the embodiment of FIG. 11A, the heater 22 explained with reference to FIG. 8 is provided near the heating coil 32 in the breaker 30. When supplied with electric power from the ECU 10 at the time when it is determined that the control relay 11 is short-circuited, the heater 22 works in the same manner as the heating coil 32 to turn the contact 31 off.

Figure 11B:
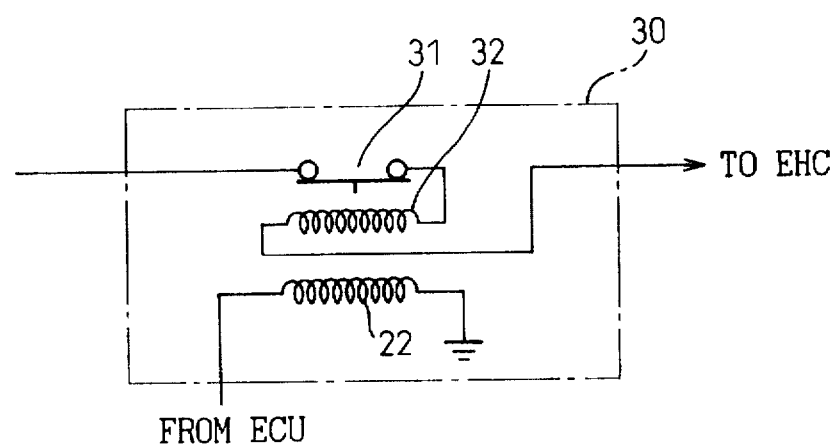
FIG. 11B is a circuit diagram illustrating the second embodiment of the internal constitution of the breaker of FIG. 10.

The breaker 30 shown in FIG. 11B has a contact 31, that is turned off when the temperature is raised, and a heating coil 32 that are connected in series. The heating coil 32 is folded and is positioned by the contact 31.

When the amount of electric power supplied to the EHC 5 exceeds the predetermined value, an increased current flows into the heating coil 32 in the breaker 30, whereby the heating coil 32 is heated and the contact 31 is turned off. In the embodiment of FIG. 11B, the heater 22 explained with reference to FIG. 8 is provided near the heating coil 32 in the breaker 30. When supplied with electric power from the ECU 10 at the time when it is determined that the control relay 11 is short-circuited, the heater 22 works in the same manner as the heating coil 32 to turn the contact 31 off.

Figure 11C:
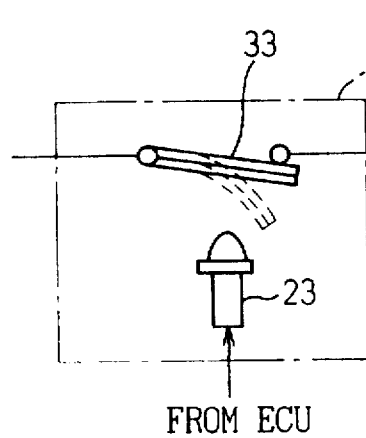
FIG. 11C is a circuit diagram illustrating the third embodiment of the internal constitution of the breaker of FIG. 10.

The breaker 30 shown in FIG. 11C has a bimetal switch 33 which undergoes deformation to turn the power supply circuit off when the temperature in the breaker 30 is raised. A burner 23 driven by the ECU is provided by the bimetal switch 33. The burner 23 may be the same as the one described with reference to FIG. 9.

In this breaker 30, a current flowing through the bimetal switch 33 increases when the amount of electric power supplied to the EHC 5 exceeds the reference value, and the bimetal switch 33 generates heat and is deformed from a position of a solid line to a position of a broken line to shut off the power supply circuit. In the embodiment of FIG. 1C, the burner 23 is ignited by the ECU 10 when it is determined that the control relay 11 is short-circuited, and the bimetal is deformed by the flame to shut off the power supply circuit.

Figure 11D:
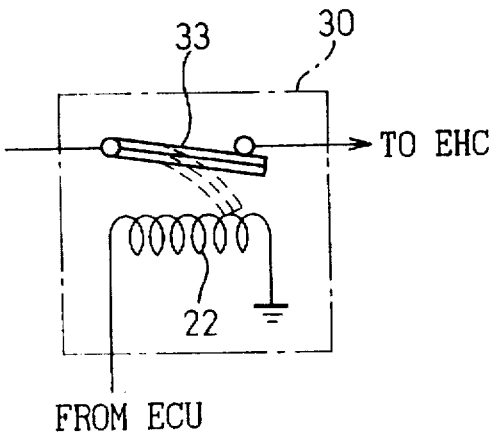
FIG. 11D is a circuit diagram illustrating the fourth embodiment of the internal constitution of the breaker of FIG. 10.

The breaker 30 shown in FIG. 11D is constituted nearly in the same manner as the breaker 30 shown in FIG. 11C, and has a bimetal switch 33 which undergoes the deformation to turn the power supply circuit off when the temperature therein is raised. In the embodiment of FIG. 11C, the burner 23 driven by the ECU is provided by the bimetal switch 33. In the embodiment of FIG. 11D, however, the heater 22 explained with reference to FIG. 8 is provided.

In this breaker 30, a current flowing through the bimetal switch 33 increases when the amount of electric power supplied to the EHC 5 exceeds the reference value, and the bimetal switch 33 generates heat and is deformed from a position of a solid line to a position of a broken line to shut off the power supply circuit. In the embodiment of FIG. 11D, electric power is supplied to the heater 22 from the ECU 10 when it is determined that the control relay 11 is short-circuited, and the bimetal is deformed by heat to shut off the power supply circuit.

Figure 12:
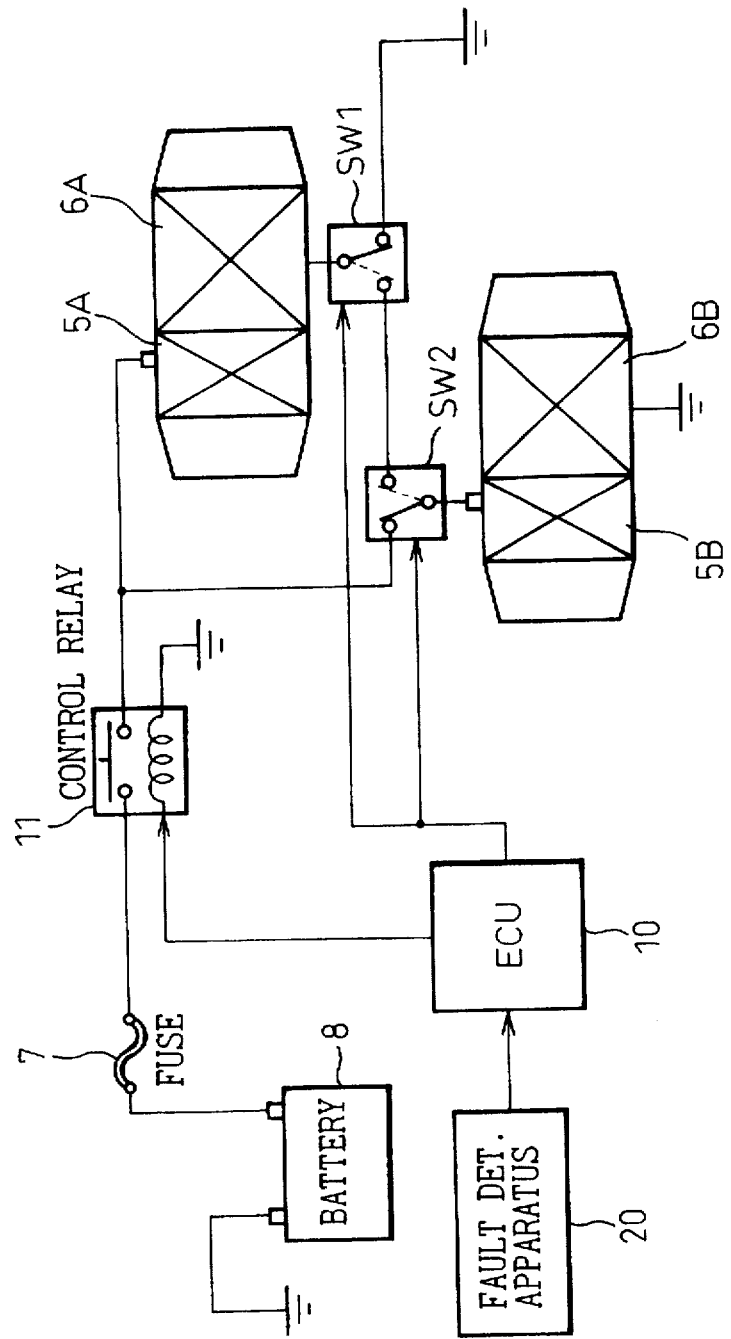
FIG. 12 is a diagram illustrating the constitution of the fifth embodiment of the device for controlling power supplied to an electrically heated catalyst of the present invention.

FIG. 12 is a diagram illustrating the constitution of the apparatus for controlling power supplied to the electrically heated catalyst according to a fifth embodiment of the present invention, which is adapted to a vehicle which uses two EHCs 5. In this embodiment, electric power is supplied from the battery 8 to the two EHCs 5A and 5B connected in parallel through the fuse 7 and control relay 11. The control relay 11 is actuated by the ECU 10 and the fault detecting circuit 20 is connected to the ECU 10 in the same manner as the aforementioned apparatuses for controlling the supply of electric power of the first to the fourth embodiments.

The power supply circuit is directly connected from the control relay 11 to the input terminal of one EHC 5A, and a ground terminal of the EHC 5 is grounded via a change-over switch SW1 of which the change-over contact is normally at a position of a solid line. To the input terminal of the other EHC 5 is connected the power supply circuit from the control relay 11 via a change-over switch SW2 of which the change-over contact is normally at a position of a solid line, and a ground terminal of the EHC 5 is grounded. Contacts which are not normally connected in the change-over switches SW1 and SW2 are electrically connected together.

In the apparatus for controlling power supplied to the electrically heated catalyst according to the fifth embodiment, the change-over switches SW1 and SW2 are changed from the positions of solid lines to the positions of dotted lines by the ECU 10 when it is determined by the fault detecting apparatus 20 that the control relay 11 is short-circuited. The EHC 5A and EHC 5B are connected in series with the power supply circuit. Then, the current consumed by the EHC 5A and EHC 5B is halved compared with that of when the EHC 5A and EHC 5B are connected in parallel, and heat that is generated is decreased to one-fourth. As a result, the EHC 5 is prevented from being overheated, and reliability is enhanced in case a fault has occurred.

Figure 13:
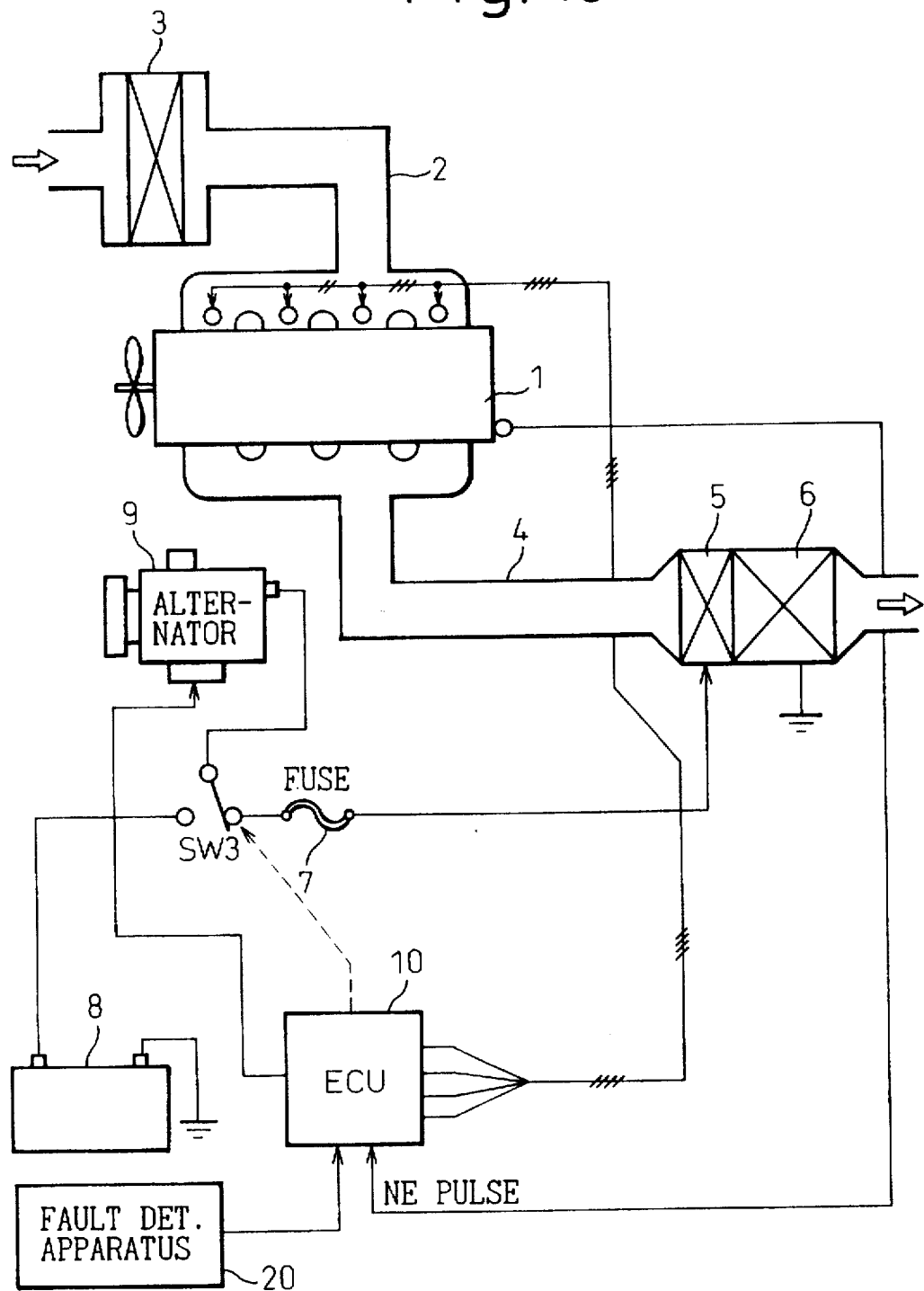
FIG. 13 is a diagram illustrating the constitution of the sixth embodiment of the device for controlling power supplied to an electrically heated catalyst of the present invention.

FIG. 13 is a diagram illustrating the constitution of the apparatus for controlling power supplied to the electrically heated catalyst according to a sixth embodiment of the present invention. Near the internal combustion engine 1, in general, a generator (alternator) 9 is provided so as to be driven by the internal combustion engine 1 and to generate electricity. The battery 8 mounted on the vehicle is electrically charged by the alternator 9. A control signal is input to the alternator 9 from the ECU 10.

In this embodiment, a change-over switch SW3 is provided between the alternator 9 and the battery 8 and is controlled by the ECU 10. The change-over switch SW3 normally connects the output of the alternator 9 to the battery 8 but connects the output of the alternator 9 to the EHC 5 when the EHC 5 is to be heated. That is, when the EHC 5 is to be heated, the EHC 5 is not supplied with electric power from the battery 8 but is supplied with the output from the alternator 9 via the change-over switch SW3 and fuse 7. When the EHC 5 is being heated, the ECU 10 works to increase the amount of electric power generated by the alternator 9.

In the apparatus for controlling power supplied to the electrically heated catalyst constituted according to the sixth embodiment, a fault in the change-over switch SW3 is detected by the fault detecting apparatus 20. The change-over switch SW3 may become faulty; e.g., adhered (melt-adhered) in a state of being connected to the EHC. When the change-over switch SW3 cannot be changed over to the state of being connected to the battery 8 and when it is so determined that the change-over switch SW3 is adhered (melt-adhered) in the state of being connected to the EHC, the rotational speed of the internal combustion engine 1 is suppressed by the ECU 10 and the alternator 9 generates electric power in a suppressed amount. As a result, the EHC 5 is prevented from being overheated, and reliability is enhanced in case a fault has occurred.

Figure 14:
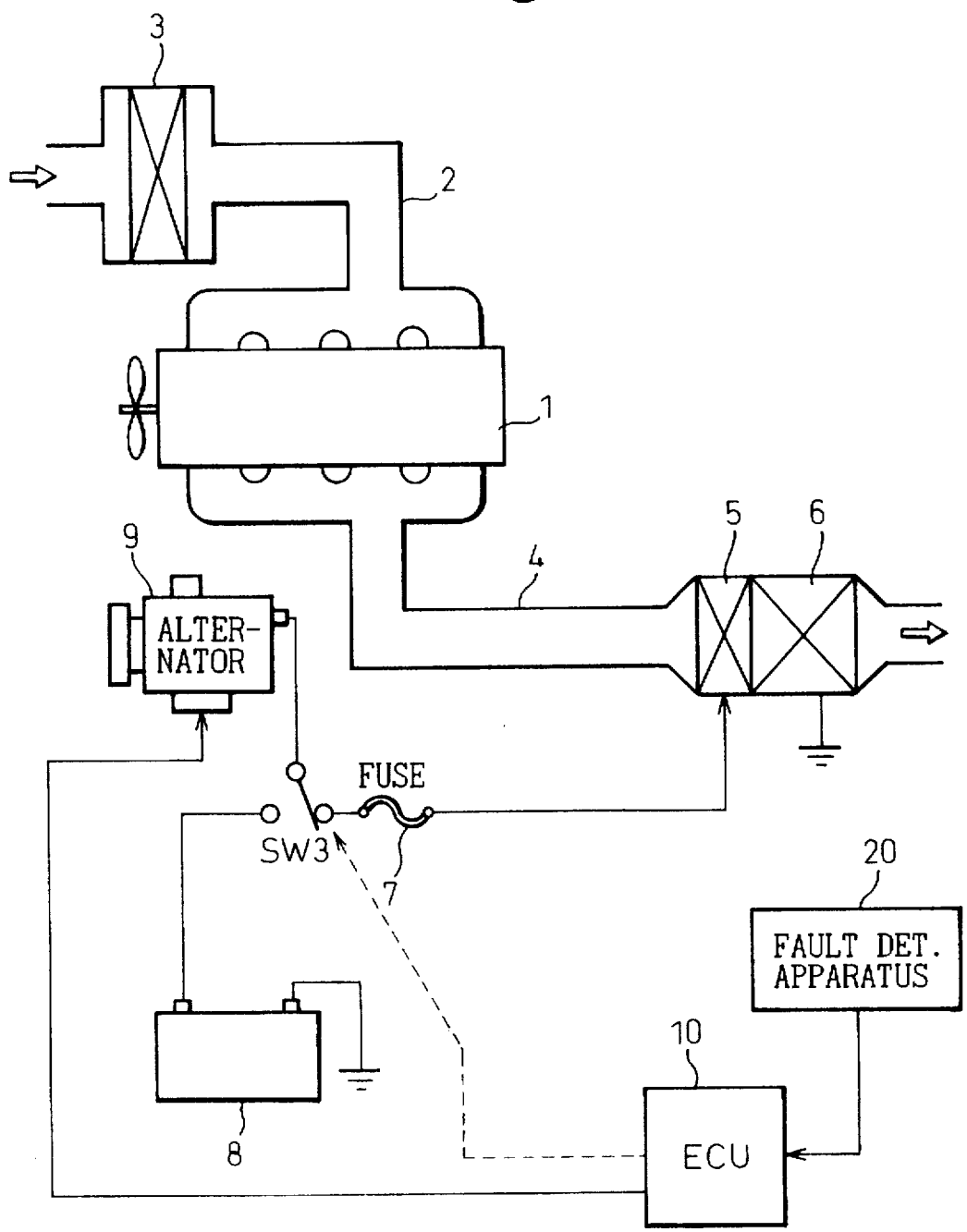
FIG. 14 is a diagram illustrating the constitution of a seventh embodiment of the device for controlling power supplied to an electrically heated catalyst of the present invention.

FIG. 14 is a diagram illustrating the apparatus for controlling power supplied to the electrically heated catalyst constituted according to a seventh embodiment of the present invention. The constitution of the seventh embodiment is nearly the same as the constitution of the sixth embodiment described with reference to FIG. 13, and the same constituent members are denoted by the same reference numerals but their description is not repeated.

In the apparatus for controlling power supplied to the electrically heated catalyst of the sixth embodiment described with reference to FIG. 13, the running speed of the internal combustion engine 1 is suppressed by the ECU 10 to suppress the amount of power generated by the alternator 9 when the change-over switch SW3 cannot be changed over to the state of being connected to the battery 8 and when it is so determined by the fault detecting apparatus 20 that the change-over switch SW3 is adhered (melt-adhered) in the state of being connected to the EHC. In the apparatus for controlling power supplied to the electrically heated catalyst of the seventh embodiment, on the other hand, a field current to the alternator 9 is suppressed by the ECU 10 to suppress the amount of power generated by the alternator 9 when the change-over switch SW3 cannot be changed over to the state of being connected to the battery 8 and when it is so determined by the fault detecting apparatus 20 that the change-over switch SW3 is adhered (melt-adhered) in the state of being connected to the EHC.

Figure 15:
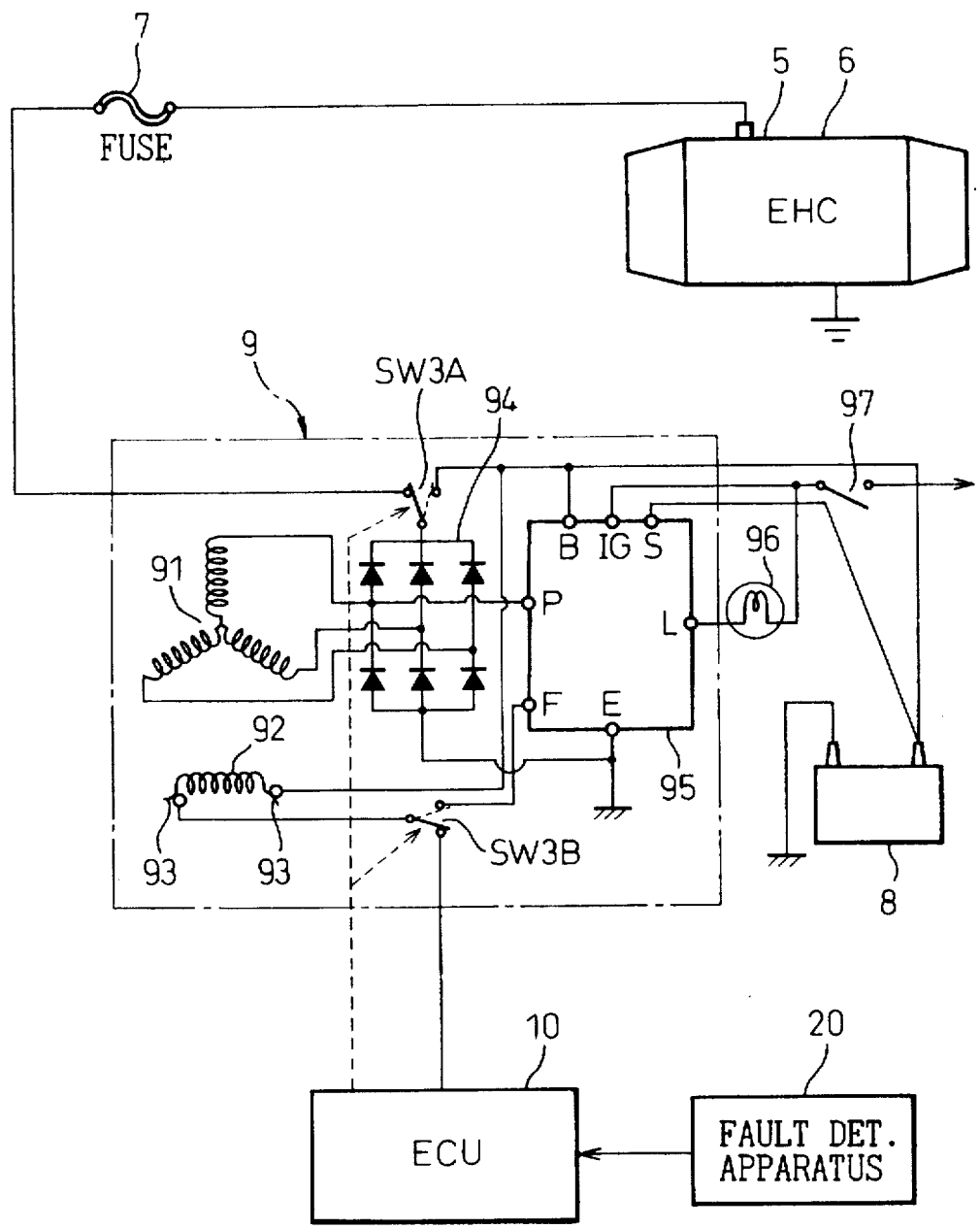
FIG. 15 is a diagram illustrating an embodiment of the internal constitution of an alternator of FIG. 14.

FIG. 15 is a diagram illustrating an embodiment of the internal constitution of the alternator of FIG. 14, and wherein the change-over switch SW3 is contained in the body of the alternator 9. In FIG. 15, reference numeral 9 denotes an alternator which contains a three-phase star-connected stator coil 91, a rotor coil 92, brushes 93, a three-phase full-wave rectifier 94 made up of a diode bridge, an IC regulator 95, and change-over switches SW3a and SW3B. The change-over switches SW3A and SW3B are changed over by the ECU 10. The change-over switch SW3B connects an end of the rotor coil 92 to the ECU 10 or to the IC regulator 95. The change-over switch SW3A connects the three-phase full-wave rectifier 94 to the IC regulator 95 or to the EHC 5 through the fuse 7. The IC regulator 95 has a charging terminal B, an ignition terminal IG connected to an ignition switch 97, a lamp terminal L connected to a charge lamp 96, a field current terminal F connected to the rotor coil 92, a phase terminal P connected to one of the phases of the stator coil 91, and an earth terminal E that is grounded. The other end of the charge lamp 96 is connected to the ignition switch 97, and the other end of the ignition switch 97 is connected to the battery 8 and to an electric circuit, that is not shown, of an automobile.

In the embodiment constituted as described above, the change-over switches SW3A and SW3B are connected to the sides of dotted lines in an ordinary state where the ignition switch 97 is turned on, and the electric power generated in the stator coil 91 is rectified through the three-phase full-wave rectifier 14 and is input to the battery 8 via the IC regulator 95. The charge lamp 96 turns on.

During the period in which the electric power is supplied to the electrically heated catalyst after the ignition switch 97 is turned on, the change-over switches SW3A and SW3B are changed over to the sides of the solid lines by the ECU 10, and the electric power generated by the stator coil 91 is rectified through the three-phase full-wave rectifier 94 and is all input to the EHC 5 through the fuse 7. The charge lamp 96 does not turn on. In this state, the ECU 10 decreases the field current that flows into the rotor coil 92 to suppress the amount of electric power generated by the alternator 9.

Figure 16:
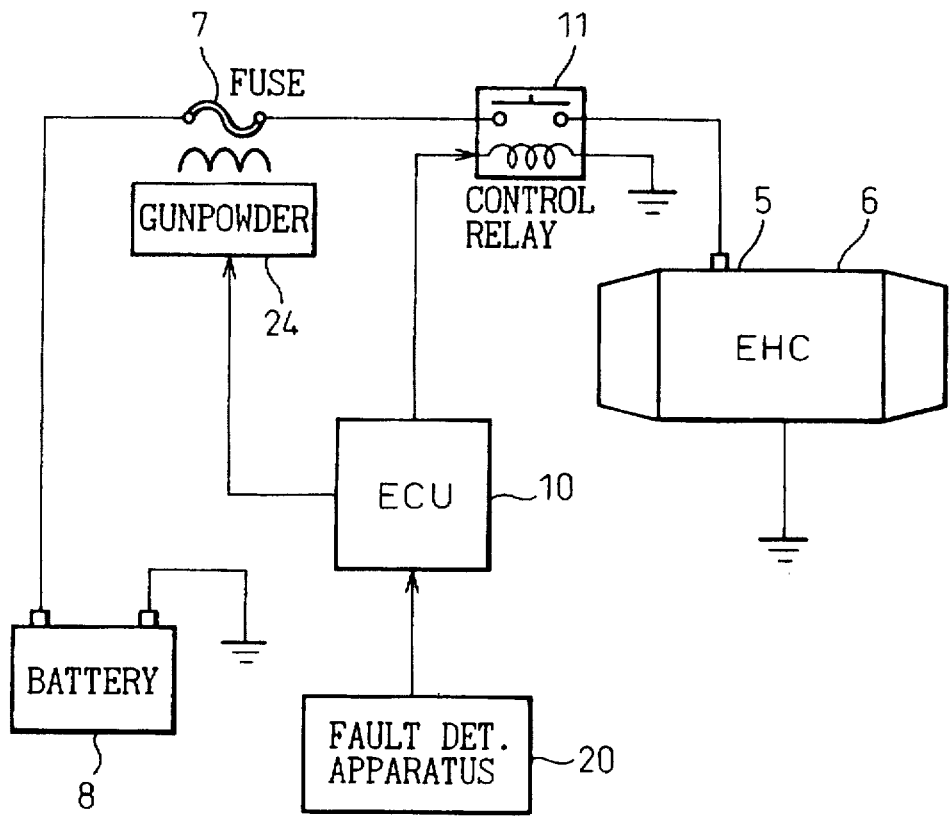
FIG. 16 is a diagram illustrating the constitution of an eighth embodiment of the device for controlling power supplied to an electrically heated catalyst of the present invention.

FIG. 16 is a diagram illustrating the apparatus for controlling power supplied to the electrically heated catalyst constituted according to an eighth embodiment of the present invention. The apparatus for controlling power supplied to the electrically heated catalyst of the eighth embodiment is a modification from the second and third embodiments described with reference to FIGS. 8 and 9. Therefore, the same constituent members as those of the apparatuses for controlling power supplied to the electrically heated catalyst of the second and third embodiments described with reference to FIGS. 8 and 9, are denoted by the same reference numerals but their description is not repeated.

In the apparatuses for controlling power supplied to the electrically heated catalyst of the second and third embodiments described with reference to FIGS. 8 and 9, the heater 22 or the burner 23 is provided near the fuse 7 for melting the fuse. In the eighth embodiment, however, a gunpowder charge 24 is provided near the fuse 7 to blow open the fuse 7. The gunpowder charge 24 is ignited and exploded by an ignition signal from the ECU 10, and the fuse 7 is blown open by the force of the explosion.

In the apparatus for controlling power supplied to the electrically heated catalyst constituted according to the eighth embodiment, the gunpowder charge 24 is ignited by the ECU 10 to explode, and the fuse 7 is blown open by the force of explosion to interrupt the supply of electric power to the EHC 5 when it is determined by the fault detecting apparatus 20 that the control relay 11 is short-circuited. As a result, the EHC 5 is prevented from being overheated, and reliability is enhanced in case a fault has occurred. This embodiment makes it possible to shut off the power supply circuit most simply, reliably and cheaply.

When the apparatus for controlling power supplied to the electrically heated catalyst is so designed that the power supply circuit can be partly shut off, then, the shut-off portion may be constructed in the form of an exchangeable unit, so that the power supply circuit after shut off can be easily restored.

As described above, the apparatus for controlling power supplied to the electrically heated catalyst of the present invention is capable of detecting the occurrence of a fault therein. When a fault in the apparatus for supplying power is detected, supply of power to the catalyst is interrupted to prevent the catalyst from being damaged by overheating and to prevent the battery from being depleted.

What is claimed is:

1. An apparatus for controlling power supplied to an electrically heated catalyst attached to an exhaust gas passage of an internal combustion engine from a power source through a power supply circuit which includes a circuit opening/closing means that is opened and closed by a control circuit of the internal combustion engine, comprising:

a fault detecting means for detecting the occurrence of such a fault that the supply of power to the electrically heated catalyst cannot be interrupted by said circuit opening/closing means;

a forcible circuit shut-off means provided in the path of the power supply circuit from said power source to said electrically heated catalyst and forcibly shuts off the power supply circuit when it is actuated; and a shut-off operation instruction means for causing said forcible circuit shut-off means to effect the shut-off operation when a fault is detected by said fault detecting means.

2. An apparatus for controlling the supply of power according to claim 1, further comprising:

an air-to-fuel ratio feedback control apparatus having air-to-fuel ratio detecting means; and an exhaust gas temperature detecting means for detecting the temperature of the exhaust gases flowing through an exhaust gas passage on the downstream side of the electrically heated catalyst; wherein said fault detecting means so determines that said circuit opening/closing means is abnormal when the value detected by said exhaust gas temperature detecting means has exceeded a reference value in a state where said electrically heated catalyst is not being heated and the values detected by said air-to-fuel ratio detecting means are indicating normal values.

3. An apparatus for controlling the supply of power according to claim 1, wherein a circuit opening/closing means constituted in the same manner as said circuit opening/closing means is used as said forcible circuit shut-off means.

4. An apparatus for controlling the supply of power according to claim 1, wherein said forcible circuit shut-off means is provided by said power supply circuit, has a cut-off means for cutting off the power supply circuit from the external side, and is constituted as an exchangeable unit.

5. An apparatus for controlling the supply of power according to claim 3, wherein said forcible circuit shut-off means is a relay.

6. An apparatus for controlling the supply of power according to claim 4, wherein said forcible circuit shut-off means is a heater which melt-cuts the fuse provided in the power supply circuit from the power source to said electrically heated catalyst.

7. An apparatus for controlling the supply of power according to claim 4, wherein said forcible circuit shut-off means is a burner which melt-cuts the fuse provided in the power supply circuit from the power source to said electrically heated catalyst.

8. An apparatus for controlling the supply of power according to claim 4, wherein said forcible circuit shut-off means is a gunpowder charge which blasts open the fuse provided in the power supply circuit from the power source to said electrically heated catalyst.

9. An apparatus for controlling the supply of power according to claim 1, wherein said forcible circuit shut-off means is a breaker.

10. An apparatus for controlling the supply of power according to claim 9, wherein said breaker is constituted by a contact that is turned off when heated to a high temperature, a heating coil for heating said contact, and a heater provided near said heating coil, and an electric current is supplied to said heater when a fault is detected by said fault detecting means.

11. An apparatus for controlling the supply of power according to claim 9, wherein said breaker is constituted by a bimetal switch which is turned off at a high temperature and a heater provided near said bimetal switch, and an electric current is supplied to said heater when a fault is detected by said fault detecting means.

12. An apparatus for controlling the supply of power according to claim 9, wherein said breaker is constituted by a bimetal switch which is turned off at a high temperature and a burner provided near said bimetal switch, and said burner is ignited when a fault is detected by said fault detecting means.

13. An apparatus for controlling the supply of power according to claim 1, wherein said fault detecting means is a Hall element unit provided in the power supply circuit to said electrically heated catalyst, and a fault is detected upon detecting a current at the time when said electrically heated catalyst is not supplied with electric power.

14. An apparatus for controlling the supply of power according to claim 1, wherein said fault detecting means is a shunt resistance provided in the power supply circuit to said electrically heated catalyst, and a fault is detected upon detecting a voltage across both terminals of said shunt resistance at the time when said electrically heated catalyst is not supplied with electric power.

15. An apparatus for controlling the supply of power according to claim 1, wherein said fault detecting means is a means for detecting a voltage at the terminal of said electrically heated catalyst, and a fault is detected upon detecting a voltage at the terminal at the time when said electrically heated catalyst is not supplied with electric power.

16. An apparatus for controlling the supply of power according to claim 1, wherein said fault detecting means is a means for detecting the temperature of said electrically heated catalyst, and a fault is detected upon detecting a temperature of said electrically heated catalyst which is higher than a predetermined temperature at the time when said electrically heated catalyst is not supplied with electric power.

17. An apparatus for controlling the supply of power according to claim 1, wherein said fault detecting means is constituted by a Hall element unit provided in the power supply circuit to said electrically heated catalyst, a means for detecting a voltage at the terminal of said electrically heated catalyst and a resistance detecting means which calculates the resistance of said electrically heated catalyst relying upon the outputs of said Hall element unit and said voltage detecting means, and a fault is detected upon detecting a resistance which is larger than a predetermined value at the time when said electrically heated catalyst is not supplied with electric power.

* * * * *